(12) United States Patent
Erlewein (10) Patent No.: US 10,921,483 B2
(45) Date of Patent: Feb. 16, 2021

(54) OPTOELECTRONIC SENSOR AND METHOD FOR DETECTING TRANSPARENT OBJECTS

(71) Applicant: SICK AG, Waldkirch (DE)

(72) Inventor: Patrick Erlewein, Waldkirch (DE)

(73) Assignee: SICK AG, Waldkirch (DE)

( * ) Notice: Subject to any disclaimer, the term of this patent is extended or adjusted under 35 U.S.C. 154(b) by 274 days.

(21) Appl. No.: 16/136,623

(22) Filed: Sep. 20, 2018

(65) Prior Publication Data

US 2019/0086578 A1 Mar. 21, 2019

(30) Foreign Application Priority Data

Sep. 21, 2017 (DE) .................. 10 2017 121 891

(51) Int. Cl.
*G01V 8/14* (2006.01)
*B65B 57/02* (2006.01)
*B07C 5/12* (2006.01)
*G01V 8/18* (2006.01)
*G01N 21/90* (2006.01)

(52) U.S. Cl.
CPC ............ *G01V 8/14* (2013.01); *B07C 5/126* (2013.01); *B65B 57/02* (2013.01); *G01V 8/18* (2013.01); *G01N 21/90* (2013.01)

(58) Field of Classification Search
CPC ... G01V 8/10; G01V 8/14; G01V 8/18; G01V 8/22; G01V 8/26; G01N 21/90; G01N 21/9036
USPC ............................. 250/223 B, 338.1; 209/522
See application file for complete search history.

(56) References Cited

U.S. PATENT DOCUMENTS

| | | | |
|---|---|---|---|
| 4,076,979 A | 2/1978 | Walter et al. | |
| 4,912,337 A * | 3/1990 | Wilwerding | B07C 5/10 250/223 B |
| 2005/0069191 A1 * | 3/2005 | Van Der Meer | G01N 21/9036 382/142 |
| 2008/0002182 A1 * | 1/2008 | Akkerman | G01N 21/9045 356/73 |

FOREIGN PATENT DOCUMENTS

| | | |
|---|---|---|
| DE | 245173 A1 | 4/1987 |
| DE | 19627083 A1 | 1/1998 |
| DE | 19804317 A1 | 8/1999 |
| DE | 10016892 B4 | 3/2006 |
| DE | 102006057878 A1 | 4/2008 |

(Continued)

*Primary Examiner* — Kevin K Pyo
(74) *Attorney, Agent, or Firm* — Nath, Goldberg & Meyer; Jerald L. Meyer; Stanley N. Protigal (57) ABSTRACT

An optoelectronic sensor (10) is provided for detecting transparent objects (30) in a monitored zone (22) that has a light transmitter (12) for transmitting a light signal (14), a light receiver (26) for generating a received signal from the received light signal, an evaluation unit (28) that is configured to evaluate the received signal and to generate an object determination signal that indicates whether a transparent object (30) has been detected in the monitored zone (22), and an output (32) for outputting the object determination signal. The evaluation unit (28) is further configured to recognize with respect to the received signal and to a piece of reference information whether a detected transparent object (30) has an additional feature (34) and to output a corresponding piece of additional feature information.

15 Claims, 3 Drawing Sheets

(56) References Cited

FOREIGN PATENT DOCUMENTS

| | | |
|---|---|---|
| DE | 102010036883 A1 | 2/2012 |
| DE | 102016013940 A1 | 5/2017 |
| EP | 0891044 A1 | 1/1999 |
| EP | 1843175 B1 | 1/2010 |
| EP | 2520952 A2 | 11/2012 |

\* cited by examiner

OPTOELECTRONIC SENSOR AND METHOD FOR DETECTING TRANSPARENT OBJECTS

FIELD

The invention relates to an optoelectronic sensor, in particular a light barrier or a light scanner, for detecting transparent objects in a monitored zone that has a light transmitter for transmitting a light signal, a light receiver for generating a received signal from the received light signal, an evaluation unit that is configured to evaluate the received signal and to generate an object determination signal that indicates whether a transparent object has been detected in the monitored zone, and an output for outputting the object determination signal and to a method for detecting transparent objects in a monitored zone in which a light signal is transmitted, the received light signal is converted into a received signal, and the received signal is evaluated to generate and output an object determination signal that indicates whether a transparent object has been detected in the monitored zone.

BACKGROUND

A light barrier detects the presence of an object according to whether the light beam is interrupted or not and outputs a corresponding switching signal. Light barriers are known as through beam sensors in which the light receiver is arranged opposite the light transmitter and the light beam spans a monitored zone between them. There are furthermore reflection light barriers in which the light transmitter and the light receiver are arranged at the same side and the light barrier is reflected back with the aid of a reflector, frequently a retroreflector, and thus passes through the monitored zone twice. A light scanner is set up in a similar manner to a reflection light barrier, with the light scanner not being directed to a cooperative reflector, but rather into free space and thus, in a reversal of the light barrier principle, actually receiving transmitted light when an object enters into the transmitted beam. It is also known for all of these sensor types to arrange a plurality of sensors in parallel with one another and thus to form a light grid or a sensory light grid.

The sensor typically recognizes a beam interruption by a threshold evaluation of the received signal. A large signal distance between an optical path with and without an object is therefore helpful for a robust switching behavior. However, this is actually not present in the recognition of transparent objects because only a small portion of the light is blocked. There have, however, for some time been different approaches of also detecting transparent objects by adapting the threshold or by an additional threshold.

A reflection light barrier that utilizes two thresholds is thus known from DE 196 27 083 A1. The first threshold corresponds to the typical threshold on whose falling below a conclusion is drawn on an obscuring object in the optical path. An additional second threshold is even set above the reception level with a free optical path and its exceeding indicates a transparent object. The idea behind this is that a large number of transparent objects, in particular bottles, act like a cylindrical lens due to their shape in practice and focus the light of the reflection light barrier.

Two thresholds are likewise set in a reflection light barrier in accordance with DE 198 04 317 A1 that are, however, below the reception level with a free optical path. A sensitive detection for transparent objects and a robust detection of other objects is thus made possible.

DE 100 16 892 B4 discloses a further reflection light barrier that should recognize transparent and reflective objects. A particularly high detection sensitivity is said to be achieved by integration of the received signals. The improved detection, however, requires a considerable additional effort since a second transmitter is used for generating transmitted light of a predefined polarization. The idea of integrating the received signal can also be seen from EP 1 843 175 B1; however, in a completely different connection than the recognition of transparent objects, namely for synchronizing the transmitter and receiver of a through beam sensor.

Whereas solutions are thus available in principle to detect transparent objects with comparatively simple sensors such as a light barrier or a light scanner, very different challenges result if the transparent object does not show any uniform transmission and remission properties. A specific example is given by bottles that have labels stuck on. Such labels can in turn be present in a considerable variety through properties such as partial transparency or color motifs.

If such labels should be recognized or at least masked, there is no satisfactory possibility for it. It is naturally conceivable to use a camera system having image evaluation. Such a sensor system is, however, in a completely different category as regards complexity and price. In addition, the installation and the alignment of the camera and the lighting is complex and/or expensive, and the image evaluation has to be taught with regard to the specific label. Difficulties can also occur here depending on the object and on the label.

The problem has previously only been able to be solved with simple light scanners or light barriers to date in that a plurality of sensors are combined. For example, two reflection light barriers having different thresholds are used. The anyway already larger effort and/or cost due to the additional sensor per se is/are further increased by the installation and above all by the joint alignment. There is also the risk that both light barriers in particular interfere with one another in the event of distances that are too small. If the label does not sufficiently differ from the object, if, for example, it is itself transparent, there are only small signal differences. The thresholds then have to be set as similar in both sensors and the robustness is greatly restricted.

SUMMARY

It is therefore the object of the invention to improve the detection of transparent objects.

This object is satisfied by an optoelectronic sensor and by a method for detecting transparent objects in a monitored zone in accordance with the respective independent claim. The sensor transmits a light signal, preferably as a tightly restricted light pencil or light beam for a one-dimensional monitored zone and generates a received signal from the received light signal. The received signal is first, as explained in the introduction, for example, evaluated using a threshold set as sensitive due to the transparency or using a plurality of thresholds, to recognize transparent objects in the optical path and to provide a corresponding object determination signal to an output.

The invention starts from the basic idea of additionally evaluating the received signal with respect to an additional feature. The example already used for an additional feature in the introduction is a label. A piece of reference information on a transparent object is available to the evaluation unit. This makes it possible to decide whether the transparent object has the additional feature or not and this piece of additional feature information is likewise output. The piece of reference information corresponds, in dependence on the embodiment, to a transparent object with the additional feature or without the additional feature or a piece of reference information is even available both for a transparent object with an additional feature and without an additional feature. It is also conceivable that the transparent objects bear one or a plurality of possible additional features. A decision is then made whether an additional feature is present at all or the additional features are additionally still distinguished. Since the piece of reference information is relatively simple as a rule it is not possible to reliable distinguish any desired additional features; however, it is in particular still possible in many cases for two or less additional features that are not too similar.

The invention has the advantage that the sensor not only detects transparent objects, but also evaluates an additional feature at the object. The additional evaluation can take place in an integrated manner in the same process step. The sensor remains simple and inexpensive since the hardware demands do not differ from a conventional sensor such as a light barrier or a light scanner that only has a more intelligent evaluation. The installation thereby also remains very uncomplicated. Information from the system in which the sensor is used is at least not absolutely necessary, whereby the putting into operation is further simplified.

The sensor and the objects to be detected are preferably in a relative movement. The evaluations are accordingly adapted to a relative movement. The light spot the transmitted light signal generates on the object moves once over the object due to the relative movement and scans it, so-to-say. A time-dependent received signal arises here. In a very large number of applications, a relative movement is produced in that the sensor is installed in a stationary manner at a conveying device or at a conveyor belt on which the transparent objects are conveyed.

The evaluation unit is preferably configured to evaluate the received signal for the recognition of the additional feature on a transparent object only in a time interval in which the transparent object is detected. The evaluated received signal is only determined by the object by such a time restriction and the evaluation is therefore more accurate.

The time interval is preferably predefined by the object determination signal. The object determination signal is the result of the evaluation as to whether a transparent object has been detected or not. If the evaluation of the received signal for recognizing the additional feature is therefore restricted to a time interval of the "On" state of the object determination signal, the evaluation is thus restricted without any effort to the actual detection of the transparent object. Alternatively, the detection of a transparent object could be simulated, that is, for example, an exceeding or falling below of a threshold by the received signal could determine the limits of the time interval. A further alternative an additional trigger sensor or a trigger signal of a higher ranking control of, for instance, the conveying device on which the objects move. However, both require additional effort.

The evaluation unit is preferably configured to recognize a change of the relative movement with reference to a deviation of the time interval from an expectation. The expected time interval in which an object is detected by the sensor can be determined from the speed of the relative movement and from the extent of the objects to be detected in the conveying direction. If the actual speed differs, the received signal applied over the time interval is compressed or stretched, which can result in false evaluations. The result is in particular falsified on the integration of the received signal over the time interval, as in some embodiments still to be explained, when the relative movement does not correspond to the expectation, that is, for example, when a conveyor belt runs at a different speed. The sensor can recognize the deviations in the speed or a stopping of the conveyor belt during the detection itself and can, for example, output a warning to the system. It would also be conceivable to adapt a scanning rate of the received signal to the actual time interval of the detection of an object so that at least the received signal of a following object is again present with an expected number of scans.

The evaluation unit is preferably configured to use a piece of information acquired from a received signal of a reference object as the piece of reference information, with the reference object being a transparent object to be detected with and/or without an additional feature. The received signal of the reference object is also called a reference signal. The reference signal can be acquired from the transparent object as such that does not have any additional feature. A reference signal from a transparent object with the additional feature is equally conceivable, or a combination of the two. As already mentioned, the sensor can also be further developed such that a plurality of additional features are distinguished, with then reference signals preferably being used from the respective transparent object with one of the additional features. The reference signals are advantageously determined in a teaching process on the putting into operation. It is, however, also conceivable to acquire the piece of reference information in advance or centrally by measurement or by modeling and then to parameterize it or install it. The transfer of the piece of reference information from a sensor to be replaced to a replacement device is a special case.

The evaluation unit is preferably configured to integrate the received signal. The time-dependent information is combined by the integration, in particular while traveling through the optical path in a relative movement. The integration preferably takes place over the time interval in which the object is detected. One or more part sections are, however, also conceivable.

The evaluation unit is preferably configured to use a piece of information acquired from an integrated received signal of a reference object as the piece of reference information, with the reference object being a transparent object to be detected with and/or without an additional feature. A piece of summary reference information is thereby produced with whose aid evaluation can be performed very simply. The comparison value is preferably an integrated received signal of a just detected object or of an object to be detected, with the integration preferably taking place in each case over the same time section, i.e. the time interval in which the object or reference object is in the optical path, or over one or more part sections.

The evaluation unit is preferably configured to use a threshold value from the integrated received signal of the reference object as the piece of reference information. The piece of summary reference information acquired by integration is therefore a threshold that permits a very simple evaluation for localizing the piece of additional feature information. The threshold can be taught in that a reference object is led through the optical path and the reference signal measured in so doing is integrated. It is, however, also possible to determine the threshold by simulation, for example, with reference to the additional feature to be detected and to transfer it to the sensor. Depending on the reference signal, the threshold provides different evaluation possibilities. If the reference signal, for example, corresponds to a transparent object without any additional feature, a falling below of the threshold means that the detected transparent object evidently has a deviation, that is bears some kind of additional feature. If the application ensures that there is only one possible additional feature, this is already sufficient for the detection of the piece of additional feature information. A further possibility is to determine a threshold from the integrated reference signal of a transparent object with the additional feature to be determined. If the integrated received signal is then in a corridor about this threshold, a conclusion is drawn from this that the just detected object has the additional feature.

The evaluation unit is preferably configured to output the object determination signal and the piece of additional feature information at the output. The sensor in accordance with the invention outputs two pieces of information: the object determination signal that bears the information whether a transparent object has been detected; and the piece of additional feature information that can again mean that a currently detected transparent object or the last detected transparent object bears no additional feature or an additional feature or, more specifically, that it bears the correct additional feature. The sensor can output this information together at the same output that typically acts as a switching output for the object presence. The piece of additional feature information can be superposed by means of modulation, for instance by a pulse or by a pulse code. A time-offset output of both pieces of information such as on request or in time multiplex is also conceivable.

The sensor preferably has a further output for outputting the piece of additional feature information. In this embodiment, the output for the object determination signal remains as with a conventional sensor. The piece of additional feature information is provided at at least one separate output or pin, with a plurality of additional outputs also being conceivable to confirm that the additional feature has been recognized or an error message for a transparent object without an additional feature. If even a plurality of additional features are distinguished, then a respective output per additional feature or any desired codes for the respective recognized additional feature at an output are possible. Finally, it is also conceivable that the output for the object determination signal and/or a dedicated output for the piece of additional feature information is/are configured for a communication protocol such as IO-link.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
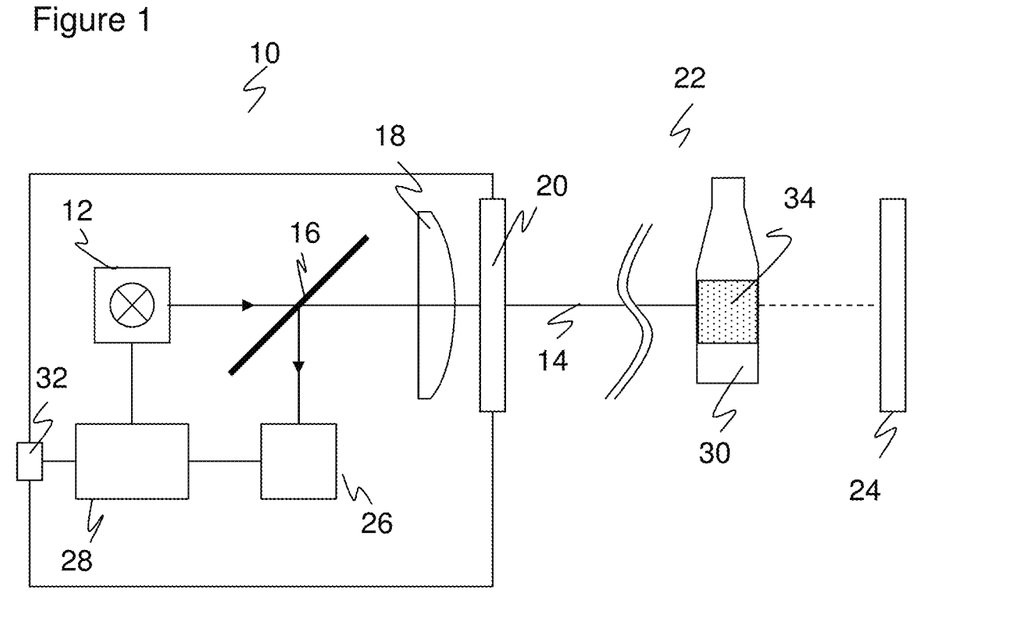
FIG. 1 a simplified block diagram of an optoelectronic sensor.

FIG. 1 shows a block diagram of an embodiment of an optoelectronic sensor 10 in accordance with the invention as a reflection light barrier. The invention will be described for the example of a reflection light barrier, that is also called a glass light barrier due to the detection capability for transparent objects, but is not restricted thereto. Other, comparatively simply one-dimensional optoelectronic sensors such as through beam sensors or light scanners without cooperative reflectors are also in particular conceivable. The signal developments discussed below change with the sensor principle, but not the general evaluation possibilities in accordance with the invention, with reflection light barriers demonstrating advantages with transparent objects, for example a comparatively high useful level with respect to a simple light scanner.

The sensor 10 has a light transmitter 12 having a light source, for example a laser or an LED, and is able to generate a transmitted light beam 14 that passes through a beam splitter 16 and is bundled via an optics 18. The transmitted light beam 14 passes through a front screen 20, passes through a monitored zone 22, is then incident on a reflector 24, in particular a retroreflector, arranged at that side, and returns to the sensor 10. After a repeat beam shaping in the optics 18, the returning transmitted light beam 14 is reflected at the beam splitter 16 and is registered in a light receiver 26, for example a photodiode or a pixel-resolved matrix image sensor.

The incident transmitted light beam 14 is converted in the light receiver 26 into an electrical received signal that is evaluated by an evaluation unit 28. If an object 30 is located in the monitored zone 22 spanned by the transmitted light beam 14 and if said object 30 at least partly interrupts the transmitted light beam 14, less light or no light is incident on the light receiver 26. The evaluation unit 28 in this manner recognizes the presence or absence of an object 30 in the monitored zone 22. A corresponding binary object determination signal is placed onto an output 32 as a switching signal. To avoid a fast switching to and fro with a received signal level in the proximity of the switching threshold, the evaluation preferably takes place with a hysteresis.

The object 30 to be detected in accordance with the invention is not any desired object, but is rather transparent, on the one hand, and has an additional feature 34, on the other hand. The evaluation of a received signal for detecting transparent objects is possible, for example, as discussed in the introduction, by one or more suitable thresholds. The invention is not, however, restricted to a specific form of detection of transparent objects, for that is known per se to this extent. The evaluation in accordance with the invention to be explained in the following rather deals with the further demand of acquiring a piece of additional feature information on the additional feature 34.

Figure 2:
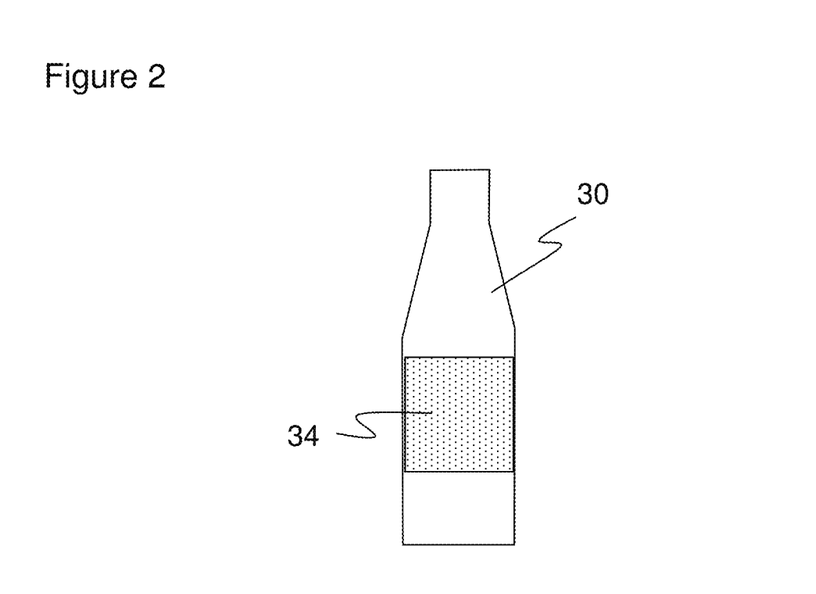
FIG. 2 a representation of a bottle with a label as an example of a transparent object to be detected with the additional feature.

FIG. 2 is a representation of a bottle having a semi-transparent label as an example of a transparent object 30 to be detected with an additional feature 34. In a practical application, such a bottle together with the semi-transparent label can be predefined by an operator of the plant in which the sensor 10 is used. Such bottles and labels should then be detected and monitored in operation. Some typical examples for a desired detection beyond the presence determination of the bottle are: Is a label attached to every bottle? Is the correct label attached to every bottle? Which of a plurality of known labels is applied? Is it ensured for the next process step that a label is no longer present?

The bottle shown in FIG. 2 with a semi-transparent label is only an example and the invention permits a large number of variations here. The label can initially also be opaque, only cover a part of the width of the bottle, and have the most varied partially transparent or masking black and white or color motifs. If the transmitted light beam 14 is only incident on opaque object regions during the entire detection, an evaluation for a transparent object 30 with an additional feature 34 in accordance with the invention is actually not necessary; however, it will all the more correctly detect such objects as a rule, for example with suitably set thresholds.

A different additional feature 34 would be conceivable instead of a label such as a direct print, an embossing, or a contour of the bottle. A content of the bottle can also be an additional feature 34 to be detected, for instance whether the bottle is filled at all or whether the desired filling level is reached. The transparent object 30 can also itself vary, just like the additional feature 34. Conveying elements, packaging, and other objects of transparent plastic or glass can be considered for this, with trays or Petri dishes being mentioned as one of a large number of examples to which in turn a sticker or another additional feature 34 is attached.

Figure 3:
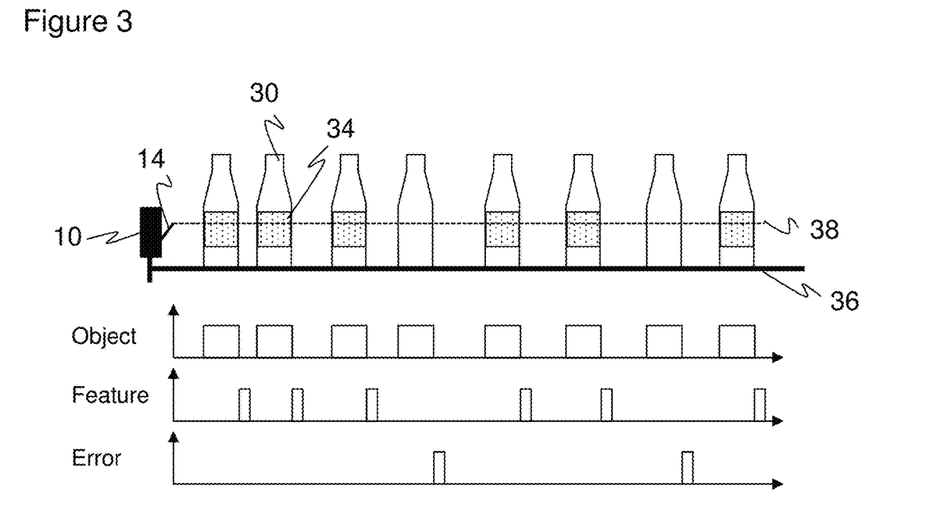
FIG. 3 an exemplary detection application of an optoelectronic sensor with object determination signals produced in this process and signals for a piece of additional feature information.

FIG. 3 shows an exemplary detection application of an optoelectronic sensor 10 with object determination signals produced in this process and signals for a piece of additional feature information. The sensor 10 is here installed at a conveyor belt 36 on which transparent objects 30 to be detected are conveyed. In the illustration, the sensor 10 is oriented into the plane of the paper, whereas the transparent objects 30 move from the right to the left. In so doing, the light spot generated by the transmitted light beam 14 practically scans the transparent objects 30 along a line 38 and a time-dependent received signal is produced in dependence on the light spot position on a transparent object 30, on the additional feature 34, or on an intermediate space.

Three time-dependent signals that are produced by evaluation of the received signal are shown below the illustration of the detection situation at the conveyor belt 36. The uppermost of these signals "Object" is the result of a presence determination of the transparent objects 30. The corresponding object determination signal or presence signal changes between a "Hi" level when a transparent object 30 is detected and a "Low" level in the intermediate spaces. This is also the typical signal of a conventional reflection light barrier.

A signal "Feature" is shown below the object determination signal and briefly changes in dependence on a time offset in each case after an object determination signal into a "Hi" level to confirm that the additional feature 34 was recognized. The signal "Feature" consequently remains on the "Low" level whenever one of the transparent objects 30 does not bear any additional feature 34.

The lowest of the three signals is an "Error" signal complementary to the "Feature" signal. This "Error" signal briefly changes into a "Hi" level if no additional feature 34 was recognized or, alternatively, when the additional feature 34 is not the additional feature 34 to be recognized. The "Error" signal remains on the "Low" level when a transparent object 30 bears an additional feature 34 or the correct additional feature 34.

In the example of FIG. 3, the pieces of information of the "Feature" and "Error" signals are complementary and thus redundant so that selectively one of the signals can also be dispensed with and the piece of additional feature information can be reconstructed from the other signal.

The sensor 10 has different possibilities of outputting the piece of additional feature information corresponding to the signals "Feature" and "Error". In accordance with FIG. 3, the piece of additional feature information is respectively output at two separate outputs or pins and is thereby distinguished. It is alternatively conceivable to encode this over different defined pulse lengths A and B depending on whether the additional feature 34 was detected or not. More complex pulse codes or other codes are also possible. In such embodiments, at least one additional output, not shown in FIG. 1, is provided for the piece of additional feature information, possibly even two additional outputs for a "Feature" signal and for an "Error" signal. If a plurality of additional features are in fact distinguished, these would require even more outputs so that a coding at a common output is then preferred.

In a further embodiment, the piece of additional feature information is also output at the output 32 for the object determination signal. No additional outputs thereby have to be provided. A common output is in principle conceivable by a time offset or by a time multiplex process. In order not to interfere with the switching behavior for an object determination, pulses with the piece of additional feature information are alternatively superposed on the piece of additional feature information. Care must be taken here that the pulses for the piece of additional feature information are not erroneously interpreted as a change of the object determination feature, which is, however, possible due to corresponding inertia. In a preferred embodiment, the output 32 is even configured for a communication protocol such as IO-Link via which then the object determination signal and the piece of additional feature information are output.

Figure 4:
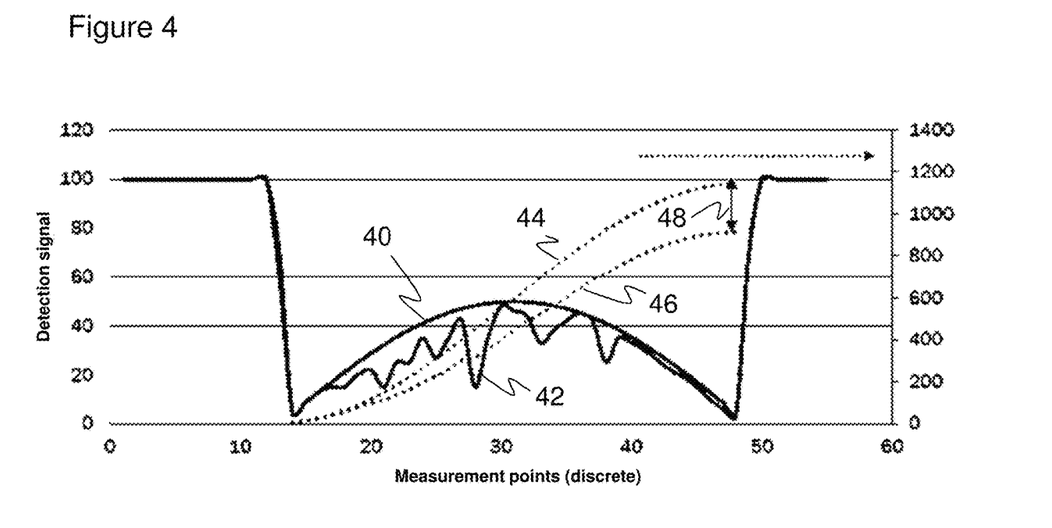
FIG. 4 a comparative representation of an exemplary first received signal for a transparent object without any additional feature and of a second received signal for a transparent object with an additional feature, and associated integrated signals.

FIG. 4 shows a schematic comparative illustration of an exemplary first received signal 40 for a transparent object 30 without an additional feature 34 and an exemplary second received signal 42 for a transparent object 30 with an additional feature 34.

The first received signal 40 initially has a high level that drops rapidly when the transparent object 30 enters into the optical path. Here, however, the number "0" at the Y axis is only to be understood as a low level; with a transparent object 30, the level is only reduced and will not disappear. When the transparent object 40 travels out of the optical path again, the level of the first received signal 40 again increases to the original value. There is an increase and a decrease therebetween that is connected to the fact that here the transparent object 30 is a bottle that has properties of a cylindrical lens.

The second received signal 42 runs in a roughly similar manner, but with the difference that fluctuations occur during the detection of the transparent object 30 depending on the transmission and remission properties of the label attached as an additional feature 34.

There are now different embodiments of an evaluation with which the additional feature 34 can be recognized from the received signal. FIG. 4 can be understood as a representation of reference signals or as measurement signals and selectively also as a comparison of a reference signal with a measurement signal. The first received signal 40, the second received signal 42, or both received signals 40, 42 can namely act as the reference signal.

In a first perspective of FIG. 4, the first received signal 40 is a reference signal and the second received signal 42 is a measurement signal or detection signal to be evaluated. The evaluation unit 28 accordingly has a piece of reference information on a transparent object 30 without an additional feature 34. However, it by no means has to be the total first received signal 40 here, but can rather also be a piece of reference information derived therefrom. It can be seen by the naked eye that a distinction is possible between the reference signal and the detection signal. In addition, a further measurement signal or detection signal, not shown, must be imagined that corresponds to a transparent object 30 without an additional feature 34 and is similar to the first received signal 40 apart from effects of the specific, individual measurement situation. If the detection signal corresponds to the reference signal, the first received signal 40 here, according to criteria still to be discussed, it is classified as a transparent object 30 without an additional feature 34, otherwise as a transparent object 30 with an additional feature 34.

Conversely, in a second perspective of FIG. 4, the second received signal 42 can be understood as a reference signal and the first received signal 40 as a detection signal to be evaluated. A further detection signal would here have to be mentally added to complete the image, with said further detection signal corresponding to a transparent object 30 with an additional feature 34 and corresponding to the second received signal except for effects of the individual measurement situation. If the detection signal corresponds to the reference signal here, now the second received signal 42, it is recognized as a transparent object 30 with an additional feature 34, otherwise as a transparent object 30 without an additional feature 34.

In a third perspective, both received signals 40, 42 shown are reference signals. A detection signal, not shown, is thus compared and depending on which of the received signals 40, 42 it rather coincides with, the piece of additional feature information is output for the detected transparent object 30.

The evaluation unit 28 can determine a sufficient agreement between a detection signal to be evaluated and the reference signal or signals corresponding to the first received signal 40 and/or to the second received signal 42 in different manners. It can easily be recognized by the eye in FIG. 4 that the first and second received signals 40, 42 can be clearly separably distinguished. Such differences for a transparent object 30 without an additional feature 34 and a transparent object 30 with an additional feature 34 are also accessible to an evaluation, for example by a pattern comparison or by a correlation. Such a procedure requires a certain effort, particularly when the differences are only small, for instance due to a transparent label, and typically also requires a buffering of the respective progressions of the reference signal and the detection signal.

The comparison therefore takes place by integration in a preferred embodiment, whereby the evaluation becomes a lot leaner and simpler, but remains robust in so doing. FIG. 4 illustrates a first integrated received signal 44 and a second integrated received signal 46 by dotted lines, said signals being respectively produced by integration from the first received signal 40 or the second received signal 42. The integrated signals 44, 46 can be produced stepwise by discrete integration at discrete sampling points, preferably equidistant sampling points, of the received signals 40, 42 without the respective time-dependent signal having to be buffered. The starting point and the end point of the integration are, as shown, preferably respectively the point in time at which the transparent object 30 enters into the optical path of the sensor 10 or exits the optical path. The object determination signal can serve as the trigger signal or the corresponding evaluation result can serve its generation in the evaluation unit 28. An external trigger by a further sensor or a signal of a higher ranking control of the plant, for instance, to which the conveyor belt 36 belongs is, however, likewise conceivable.

The concluding value of the first integrated received signal 44 differs considerably from that of the second integrated received signal 46, as indicated by an arrow 48 in FIG. 4. The evaluation for determining the piece of additional feature information can therefore be carried out particularly simply and nevertheless reliably using this summary difference. A simple threshold, for example at the center of the arrow 48, is sufficient for this in principle.

The piece of reference information for the evaluation of the integrated values can preferably be acquired by teaching in that a transparent object 30, with or without an additional feature 34, acting as a reference is conducted through the optical path of the sensor 10. FIG. 4 also illustrates this; the Y values at the arrow tips of the arrow 48 can be understood as reference values for a transparent object 30 with an additional feature 34 or without an additional feature 34. A first and second integrated reference value are thus produced; however, they can naturally also be specified or parameterized differently than by a teaching procedure. In an embodiment, a threshold can be placed at their mean value.

It has already been stated that a transparent object 30 with and/or without an additional feature 34 can serve as the reference. Accordingly, especially in an evaluation by integration, the first and/or second integrated reference value can also be used. For example, a difference from the first integrated reference value indicates that the transparent object 30 in any case has some additional beam changing structure. A difference from the second integrated reference value correspondingly means that the expected additional feature 34 is not detected. If the application ensures that there are only two kinds of transparent objects 30, comparisons with the first and second integrated reference values are per se already sufficient. Alternatively, a comparison is made for an even more reliable recognition both with the first and second integrated reference values and the demand is, for example, made that the integrated value of the received signal is in a specific corridor about the respective integrated reference value.

Figure 5:
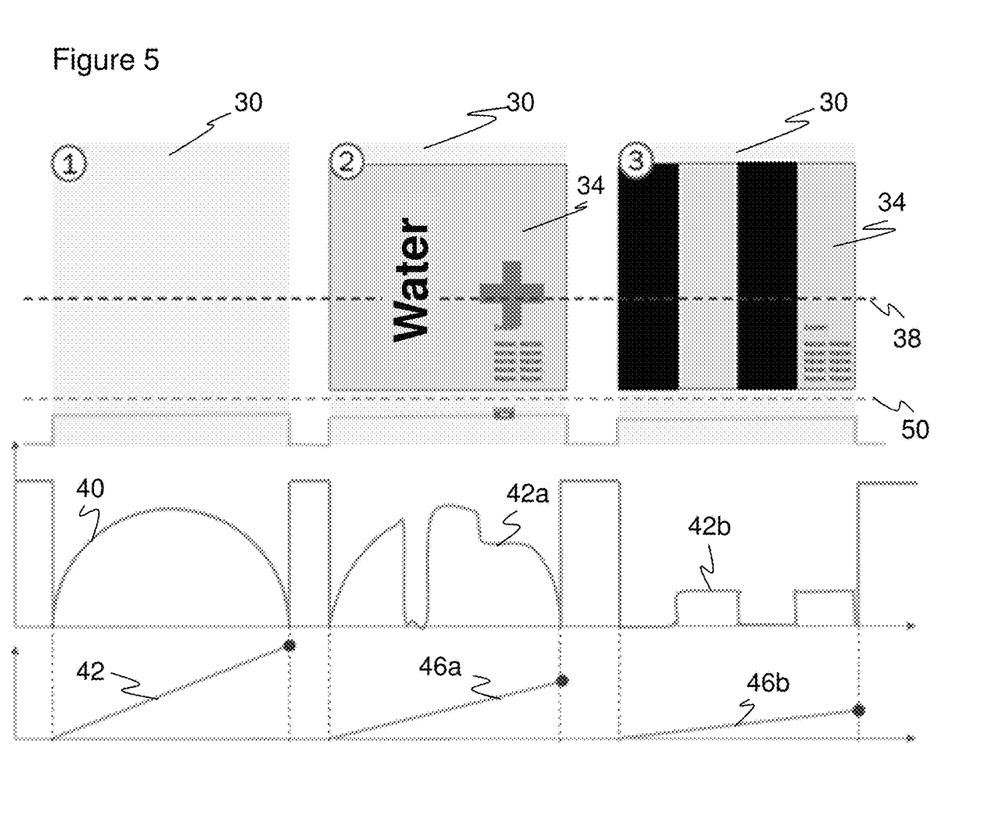
FIG. 5 three further examples for received signals of a transparent object without any additional feature and with two different additional features.

FIG. 5 shows three further examples in the form of view of a detail of a transparent object 30 and of associated received signals 40, 42*a-b* thereunder or integrated received signals 44, 46*a-b*. The situation is shown at the left by the numeral one, for comparison, for a transparent object 30 without an additional feature 34 with the first received signal 40 and with the first integrated received signal 42. Transparent objects 30 are shown next to it with the numerals two and three with two different labels as the additional feature 34 and the associated second received signals 42*a-b* and second integrated received signals 46*a-b*. The integrated received signals 44, 46*a-b* are only very schematic; they are in fact not linear, but rather have different pitches or steps depending on the associated infinitesimal or discrete plane sector of the respective received signal 40, 42*a-b*. The lower dashed line 50 marks the path of an optional reference light spot beneath the labels. The progression of the object determination signal is drawn again directly thereunder.

It can be recognized from the second received signals 42*a-b*, but also from the integrated second received signals 46*a-b* that different additional features 34 can be clearly distinguished from a transparent object 30, but also even from one another. Not only the progression of the second received signals 42*a* at the center is thus clearly distinguishable from that of the second received signal 42*b* at the right, but also the respective integrated reference values are at their respective own levels. This means two things: the piece of additional feature information can be robustly acquired both with respect to the total detection signal or sections thereof and with respect to one or more integrated reference values for the detection signal acquired for part sections, without the characteristic of the specific additional feature 34 to be recognized being particularly important. It is, however, furthermore also even possible to distinguish a plurality of additional features 34 from one another in an advantageous embodiment, and indeed also summarily using integrated reference values. It is admittedly not precluded that different labels or additional features 34 in general result in integrated reference values that are similar to one another. This is, however, only the case comparatively rarely and it can additionally be recognized during the teaching that the sensor 10 is not suitable for a specific combination of labels or additional features 34.

The detection signals are stretched or compressed with respect to the reference when the conveyor belt 36 runs at a different speed or even stops. The integrated values are then accordingly also falsified. The comparisons thus also become unreliable. How long the expected time window is in which a transparent object 30 is respectively located in the optical path and is accordingly detected can, however, also be known to the evaluation unit 28 by teaching or parameterization. This value can, for example be stored in the form of a number of sampling points. If now a difference of this stored expectation occurs during a detection, the evaluation unit 28 can recognize from it that the conveying speed has changed. The piece of additional feature information is then not reliable and the sensor 10 can draw attention to this, either by a warning over a display or by a signal to a higher ranking control. It is also conceivable that the sensor 10 adapts its sampling rate so that the detection signals are again present, at least for subsequent objects, in the expected shape without stretching or compressing.

The invention claimed is:

1. An optoelectronic sensor, for detecting transparent objects in a monitored zone, the optoelectronic sensor having:
    a light transmitter for transmitting a light signal, the light transmitter configured to transmit a tightly restricted light beam for a one-dimensional monitored zone,
    a light receiver for generating a received signal from the received light signal,
    an evaluation unit that is configured to evaluate the received signal and to generate an object determination signal that indicates whether a transparent object has been detected in the monitored zone, and
    an output for outputting the object determination signal, wherein the evaluation unit is further configured to recognize with respect to the received signal and to a piece of reference information whether a detected transparent object has an additional feature and to output a corresponding piece of additional feature information.

2. The optoelectronic sensor in accordance with claim 1 that is one of a light barrier and a light scanner.

3. The optoelectronic sensor in accordance with claim 1, wherein the sensor and objects to be detected are in a relative movement.

4. The optoelectronic sensor in accordance with claim 3, wherein the evaluation unit is configured to evaluate the received signal for the recognition of the additional feature on a transparent object only in a time interval in which the transparent object is detected.

5. The optoelectronic sensor in accordance with claim 4, wherein the time interval is predefined by the object determination signal.

6. The optoelectronic sensor in accordance with claim 4, wherein the evaluation unit is configured to recognize a change of the relative movement with reference to a deviation of the time interval from an expectation.

7. The optoelectronic sensor in accordance with claim 1, wherein the evaluation unit is configured to use a piece of information acquired from a received signal of a reference object as the piece of reference information, with the reference object being a transparent object to be detected with and/or without an additional feature.

8. The optoelectronic sensor in accordance with claim 1, wherein the evaluation unit is configured to integrate the received signal.

9. The optoelectronic sensor in accordance with claim 1, wherein the evaluation unit is configured to use a piece of information acquired from an integrated received signal of a reference object as the piece of reference information, with the reference object being a transparent object to be detected with and/or without an additional feature.

10. The optoelectronic sensor in accordance with claim 9, wherein the evaluation unit is configured to use a threshold value from the integrated received signal of the reference object as the piece of reference information.

11. The optoelectronic sensor in accordance with claim 1, wherein the evaluation unit is configured to output the object determination signal and the piece of additional feature information at the output.

12. The optoelectronic sensor in accordance with claim 1, that has a further output for outputting the piece of additional feature information.

13. A method of detecting transparent objects in a monitored zone in which a light signal is transmitted, the received light signal is converted into a received signal, and the received signal is evaluated to generate and output an object determination signal that indicates whether a transparent object has been detected in the monitored zone, the method comprising:
    transmitting the light signal a tightly restricted light beam for a one-dimensional monitored zone,
    wherein it is recognized with reference to the received signal and to the piece of reference information whether a detected transparent object has an additional feature; and wherein a corresponding piece of additional feature information is output.

14. An optoelectronic sensor, for detecting transparent objects in a monitored zone, the optoelectronic sensor having:
    a light transmitter for transmitting a light signal,
    a light receiver for generating a received signal from the received light signal,
    an evaluation unit that is configured to evaluate the received signal and to generate an object determination signal that indicates whether a transparent object has been detected in the monitored zone, and
    an output for outputting the object determination signal, wherein the evaluation unit is further configured to recognize with respect to the received signal and to a piece of reference information whether a detected transparent object has an additional feature and to output a corresponding piece of additional feature information,
and wherein the evaluation unit is configured to use a piece of information acquired from an integrated received signal of a reference object as the piece of reference information, with the reference object being a transparent object to be detected with and/or without an additional feature.

15. The optoelectronic sensor in accordance with claim 14,
wherein the evaluation unit is configured to use a threshold value from the integrated received signal of the reference object as the piece of reference information.

* * * * *